United States Patent [19]

Mine et al.

[11] 4,033,924

[45] July 5, 1977

[54] HEAT CURABLE ORGANOPOLYSILOXANE COMPOSITIONS CONTAINING ADHESION ADDITIVES

[75] Inventors: Katsutoshi Mine, Ichihara; Minoru Nishio, Chiba; Shinichi Sumimura, Ichihara, all of Japan

[73] Assignee: Toray Silicone Company, Ltd., Ichihara, Japan

[22] Filed: Oct. 26, 1976

[21] Appl. No.: 735,721

[30] Foreign Application Priority Data

Dec. 15, 1975 Japan .......................... 50-148443

[52] U.S. Cl. .................. 260/37 SB; 260/46.5 R; 260/46.5 UA
[51] Int. Cl.$^2$ ........................................ C08L 83/04
[58] Field of Search ................. 260/37 SB, 46.5 R

[56] References Cited

UNITED STATES PATENTS

| 3,131,161 | 4/1964 | Nitzsche et al. | 260/37 SB |
| 3,205,197 | 9/1965 | Cohen et al. | 260/37 SB X |
| 3,455,877 | 7/1969 | Plueddemann | 260/46.5 R |

*Primary Examiner*—Lewis T. Jacobs
*Attorney, Agent, or Firm*—Robert L. McKellar

[57] ABSTRACT

There is disclosed heat curable organopolysiloxane compositions which contain adhesion additives which are organosilicon compounds which contain an epoxy functional group and at least one alkyl group or low molecular weight alkenyl group or hydrogen atom bound to silicon.

2 Claims, No Drawings

HEAT CURABLE ORGANOPOLYSILOXANE COMPOSITIONS CONTAINING ADHESION ADDITIVES

PRIOR ART

This invention concerns a curable organopolysiloxane composition which exhibits adhesion to many various substrates. Further, this invention concerns an organopolysiloxane composition which contains an adhesive additive derived from epoxy functional compounds and organosilicon compounds. In addition, this invention concerns those organopolysiloxanes which are curable with heat and peroxide catalysts and which possess adhesion to variable substrates.

Generally, it is an established fact that curable silicone rubbers and resins, which cure through the application of heat and peroxide catalysts, do not possess completely satisfactory adhesion to other materials (i.e. substrates).

When such curable silicones were made to adhere, it was generally necessary to first apply a primer to the substrate and allow it to dry and then apply the curable silicones over that surface.

Besides having variable adhesion results, such a treatment required a two-step application process which is time consuming and economically wasteful.

Moreover, the method above was restricted to only a certain few substrates, that is, the more common substrates such as glass, wood and certain metal surfaces and, the adhesiveness was not durable over a long period of time.

Certain epoxy functional materials have been used just recently to adhere silicone materials to various substrates (see "Curable Organopolysiloxane Compositions With Improved Adhesions", U.S. Patent application Ser. No. 715,363 (Toray 7)) but such disclosure includes only silicones which are cured through the addition of silicon hydrogen containing siloxanes to alkenyl containing siloxanes using platinum as a catalyst, and there is no direction in that disclosure that rubbers curing through heat and peroxide catalysis would have improved adhesion.

It was discovered that the presence of the peroxide catalyst did not severely hamper the adhesive ability of the adhesion additive and that peroxide cured rubbers had improved adhesion over prior art primer systems.

Thus, it is an object of this invention to produce organopolysiloxane compositions, which cure under the influence of heat and peroxide, and which give improved adhesion over the prior art primer system.

It is a further object to produce organopolysiloxane compositions which cure under the influence of heat and peroxide and which have enhanced adhesion to a greater number of types of substrates.

THE INVENTION

The invention consists of a heat curable organopolysiloxane composition which consists of (1) 100 parts by weight of an organopolysilxane having the general formula $$R_aSiO_{4-a/2}$$

wherein R is a hydroxy group, an alkoxy radical containing 1-4 carbon atoms or a substituted or unsubstituted hydrocarbon radical containing 1-8 carbon atoms, $a$ is 1-3 and at least 25 mol percent of the R groups are monovalent unsubstituted hydrocarbon groups, (2) 0-400 parts by weight of a particulate or fibrous filler, (3) 0.01-10 parts by weight of an organic peroxide catalyst and (4) 0.01-20 parts by weight of an organosilicon compound having (i) at least one A(-R'O)$_2$Si-group attached thereto wherein A is a monovalent hydrocarbon group containing at least one

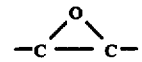

group, R' is a low molecular weight alkyl group, and (ii) at least one alkyl group containing 1-4 carbon atoms or (iii) at least one low molecular weight alkenyl group or hydrogen atom bound to silicon.

The structure of the organopolysiloxane (1) can be linear, branched linear, cyclic or three dimensional. The degree of polymerization may be from 4 to as high as 1000 to 10,000 depending on the intended use of the final product. It can be a homopolymer or copolymer.

The organopolysiloxane (1) has the general formula $$R_aSiO_{4-a/2}$$

wherein R can be a hydroxy group, an alkoxy radical containing 1-4 carbon atoms or a substituted or unsubstituted hydrocarbon radical of 1-8 carbon atoms, $a$ is 1-3 and at least 25 mol percent of the R groups are unsubstituted monovalent hydrocarbon groups.

Acceptable unsubstituted hydrocarbon groups include methy, ethyl, n-propyl, octyl, vinyl, alyl, cyclohexyl and phenyl groups. Possible substituted hydrocarbon groups include 3,3,3-trifluoropropyl, tolyl, xylyl, benzyl, p-chlorophenyl and cyanoethyl group. The alkoxy groups possible are methoxy, ethoxy, propoxy, butoxy and β-ethoxymethoxy groups. At least 25 mol% of the R's must be unsubstituted hydrocarbon groups in order to carry out the crosslinking, that is, curing by means of the organic peroxide. Methyl or vinyl groups are preferred.

Examples of composition (1) include dimethylpolysiloxane, a copolymer of dimethylsiloxane and methylvinylsiloxane, a copolymer of dimethylsiloxane and methylphenylsiloxane, a copolymer of dimethylsiloxane and diphenylsiloxane and a copolymer of dimethylsiloxane and methylhydrogensiloxane.

The organosilicon compound (Component 4) possessing at least 1 A(R'O)$_2$Si group and at least 1 alkyl, low molecular weight alkenyl group or hydrogen atom bound to silicon (where A is a monovalent epoxy containing hydrocarbon group and R' is a low molecular weight alkyl group) is necessary in order that the product may exhibit the strong adhesion of this invention. A monovalent epoxy group containing hydrocarbon group which is represented as A has the structure

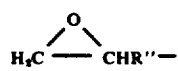

where R'' is a divalent organic radical, e.g., methylene, ethylene, propylene, phenylene, hydroxy alkylene, chloroethylene, fluoroethylene, —CH$_2$OCH$_2$CH$_2$C-H$_2$—, —CH$_2$CH$_2$OCH$_2$CH$_2$—,

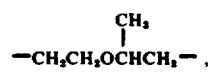

or —CH$_2$OCH$_2$CH$_2$OCH$_2$CH$_2$—. A may be β-(3,4-epoxycyclohexyl)ethyl or α-(3,4-epoxycyclohexyl)propyl. R' may be methyl, ethyl, n-propyl, isopropyl or methoxyethyl and is preferably methyl. The alkyl group bound to silicon may be methyl, ethyl, n-propyl, or isopropyl and is preferably methyl. An acceptable alkenyl group bound to silicon may be selected from among vinyl, allyl, 1-propenyl or isopropenyl and is preferably vinyl.

Examples of Component 4 include

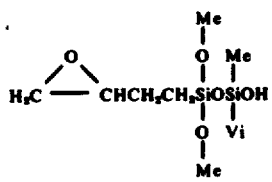

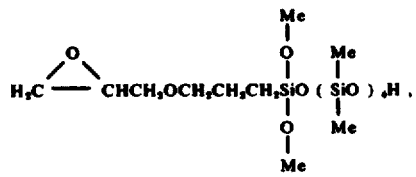

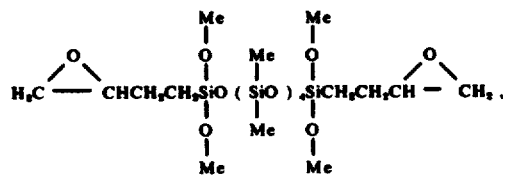

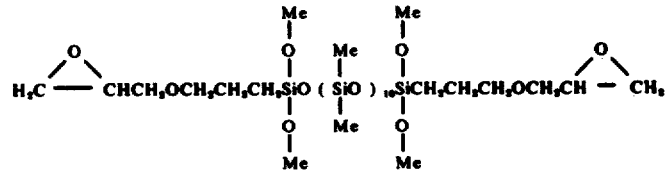

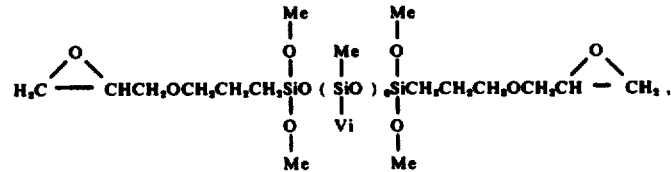

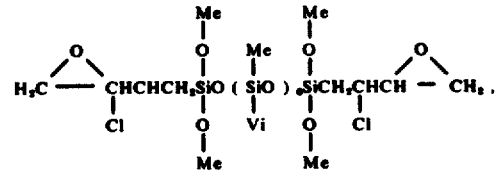

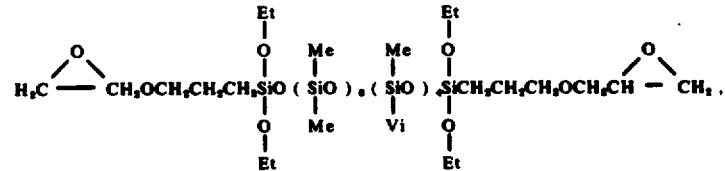

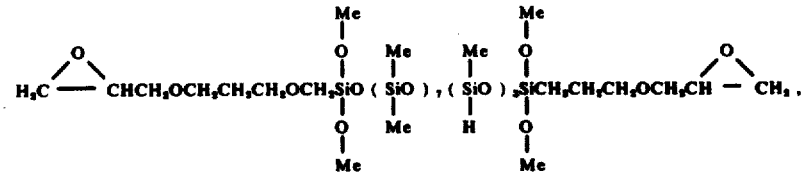

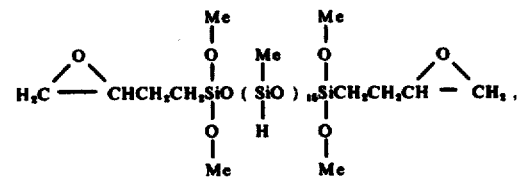

an organopolysiloxane copolymer composed of 50 mol% MeSiO$_{1.5}$, 4 mol% ViSiO$_{1.5}$, 40 mol% Me$_2$SiO and 6 mol%

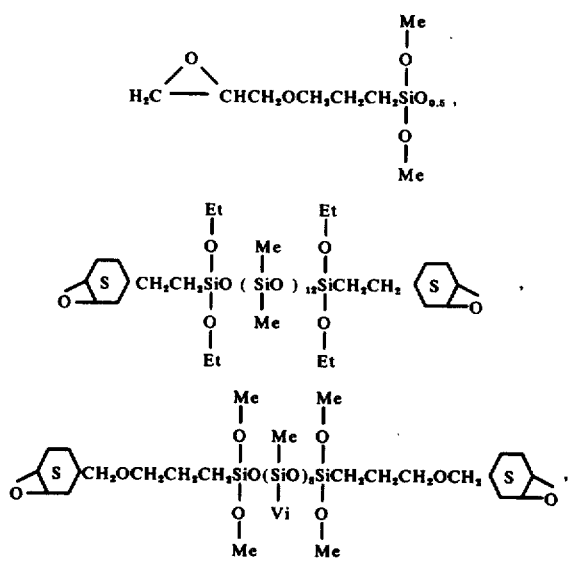

and an organopolysiloxane copolymer composed of 60 mol% MeSiO$_{1.5}$, 30 mol% Me$_2$SiO, 6 mol% Me$_3$SiO$_{9.5}$ and 4 mol%

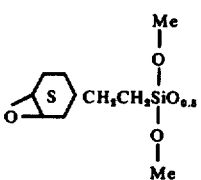

(where Me is Methyl, Et is ethyl and Vi is vinyl). Component 4 can be produced by the dealcoholization condensation of a trialkoxy silane, containing monovalent, epoxy-containing group, with an organopolysiloxane possessing silanol groups at 100° C. or greater for several hours.

The particulate or fibrous filler (Component 2) may be fumed silica, precipitated silica, hydrophobic fumed silica, hydrophobic precipitated silica, pulverized quartz, diatomaceous earth, talc, aluminum silicate, zirconium silicate, calcium carbonate, zinc oxide, titanium dioxide, ferric oxide, glass fiber, asbestos, glass beads or carbon black.

The organic peroxide catalyst (Component 3) for curing the composition of this invention may be any peroxide normally used for the curing of silicone rubber. Specific examples include benzoyl peroxide, bis(2,4-dichlorobenzoyl)peroxide, di-t-butylperoxide, t-butylperbenzoate, dicumylperoxide, t-butylperacetate, 2,5-dimethyl-2,5-di-t-butylperoxyhexane, 2,5-dimethyl-2,5-di-t-butylperoxyhexane, t-butylperoxyisopropylcarbonate, or any organosilylperoxide.

The 4 compounds mentioned above may be single compounds or mixtures of respective compounds mentioned above.

When the quantity of Component 4 is less than 0.01 parts by weight relative to 100 parts by weight of Component 1, the adhesion of the resulting composition is unsatisfactory. When the quantity of Component 4 is 20 parts by weight relative to 100 parts by weight of Component 1, the adhesion reaches a maximum. It is uneconomical to use a quantity of Component 4 greater than the value mentioned above for the workability, curing properties and other properties of the composition. Because of this the quantity of Component 4 must be 0.01–20 parts by weight, preferably 0.1–10 parts by weight relative to 100 parts by weight of Component 1. Although Component 2 is not necessarily needed for the composition of this invention, it may be needed in order to increase the viscosity of the uncured composition, in order to improve the workability, in order to improve the properties of the cured composition or in order to increase the adhesiveness of the composition. When the quantity of Component 2 is greater than 400 parts by weight as against 100 parts by weight of Component 1, the blending of both compounds is difficult and the workability of the resulting composition deteriorates. Due to this fact, the quantity of Component 2 must be less than 400 parts by weight as against 100 parts by weight of Component 1. When the quantity of Component 3 is less than 0.01 parts by weight as against 100 parts by weight of Component 1, the curing of the composition is unsatisfactory. The curing process is satisfactory when the quantity of Component 3 is 10 parts by weight as against 100 parts by weight of Component 1. When the quantity of Component 3 is greater than 100 parts by weight as against 100 parts by weight Component 1, the composition is disadvantageous from the standpoint of economics and the curing properties deteriorate. Due to this fact, the quantity of Component 3 should be 0.01–10 parts by weight, preferably 0.1–5 parts by weight, as against 100 parts by weight Component 1. The Components 2 or 3 mentioned above can be blended simultaneously or a mixture of Components 4–2 can be blended with a component or a mixture of the remaining 2 components, or a mixture of Components 4–2 can be combined with each of the remaining components in succession. One component may be combined with each of the remaining Components 4–2 in succession. When Component 3 is mixed in, the temperature is arbitrary; however, it must be less than the temperature which causes the decomposition of the organic peroxide. The mixer or blending machine employed in any type of mixer or blending machine, or a kneader, such as a kneader-mixer, a Banbury mixer, a two-roller or three-roller, a rotary mixer, a fixed container mixer, a tank mixer or a fluid mixer.

In addition to Components 1–4 mentioned above, other additives can be mixed into the composition of this invention. Possible additives include heat resistant agents, oil resistant agents, plasticizers, surface treating agents for the filler, pigments, flame resistant agents, organic solvents, and organopolysiloxanes and organosilanes not used for increasing adhesion.

When the organopolysiloxane composition of this invention is contacted with the surface of some other material such as metal and is subsequently heat treated at a temperature which is greater than the decomposition temperature of the organic peroxide the organopolysiloxane crosslinks easily, so it may be converted to silicone rubber or silicone resin which adheres to metal surfaces tightly and uniformly. The organopolysiloxane compositions of this invention adhere to various materials without primer treatment when it is heat treated.

Possible substrates used are metals, such as wrought iron, steel, stainless steel, copper, brass, nickel, chromium, aluminum, alumite, tin plate or sheet zinc; porcelain, tile, stone, glass and mica; plastics, such as epoxy resin, acrylic resin, unsaturated polyester resin, polyester resin, polycarbonate resin, polyurethane resin, ABS resin, polyamide resin, polyimide resin or cured vinyl chloride resin; synthetic fibers, such as Tetron, nylon or acrylic fiber; regenerated fibers, such as rayon or staple fiber, natural fibers; such as cotton or wool; inorganic fibers, such as glass fiber, asbestos, rock wool, carbon fiber or silicone carbide fiber; natural rubber, synthetic rubber, wood, paper or their derivatives. The composition of this invention exhibits durability of adhesion.

Thus, the organopolysiloxane of this invention can be applied to any material which requires tight and durable adhesion and can be used as an adhesive agent, a sealing agent a coating agent, a wrapping agent, an injecting agent and an impregnating agent.

The following examples illustrate the invention but are not to be considered as limiting the invention in any way.

"Parts" and "%" in the examples are "Parts by weight" and "% by weight", respectively. The viscosity and the plasticity index were measured at 25° C., unless the temperature is mentioned otherwise. In the chemical formulas, Me is methyl, Et is ethyl, Vi is vinyl and φ is phenyl.

EXAMPLE 1

100 parts of a high molecular weight dimethylpolysiloxane whose plasticity index was 150 was combined with 1.0 parts of the compound shown in Formula(1) and 40 parts fumed silica,

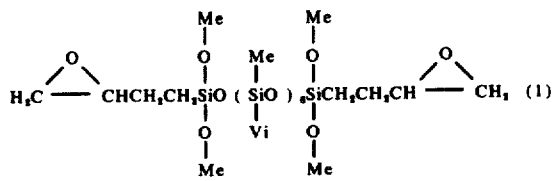

whose surface was made hydrophobic with trimethylsilyl groups (relative surface area 200 m²/g).

The resulting mixture was blended using a kneader-mixer until it was homogeneous.

100 parts of this mixture were combined with a paste composed of 0.8 parts 2,4-dichlorobenzoylperoxide and a small amount of a silicone oil in a two-roller mixer to form a sheet.

The resulting sheet was inserted between two ceramic plates (60 mm × 10 mm × 4mm). The thickness of the sheet was 1.5 mm. The overlap of the two plates was 10 mm. Curing was carried out in an oven at 250° C. for 15 minutes.

The resulting composite plate was cooled to room temperature. The two ceramic plates were drawn in opposite directions (at 180° to each other). The silicone rubber layer was destroyed. Thus the failure was cohesive failure. The adhesion strength in terms of tensile shear was 39 kg/cm².

For comparison the composition was produced by a method identical to that mentioned above with the exception that the compound shown in Formula (1) was not added. The adhesion test demonstrated that the silicone rubber layer was peeled from the ceramic plate and the failure was adhesive. The adhesion strength or tensile shear was 8 kg/cm².

EXAMPLE 2

100 parts of a high molecular weight organopolysiloxane, composed of 99.9 mol% dimethylsiloxane and 0.1 mol% methylvinylsiloxane, plasticity index 120, was mixed with 1.5 parts of the compound shown in Formula (2), 50 parts

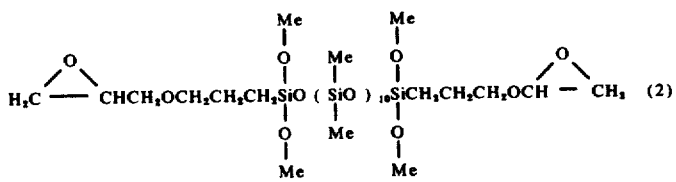

fumed silica (relative surface area 300 m²/g) and 15 parts dimethylpolysiloxane with a viscosity of 40 cs., both ends of which were blocked with silanol groups. This dimethylpolysiloxane is a surface treating agent for fumed silica. The resulting mixture was blended in a kneader-mixer until it was homogeneous. 100 parts of the resulting mixture was combined with a paste composed of 0.6 parts dibenzoylperoxide and a small amount of a silicone oil in a two roller mixer.

The peel test for this formulation was carried out according to Section 8.3, JIS K 6301 (mechanical test for vulcanized rubber) in which rubber adhering to metal plate is peeled at a 90° angle. The types of metal plates that were employed are shown in Table I. Vulcanization was carried out at 120° C. for 10 minutes. For comparison the composition was produced by a method identical to that mentioned above with the exception that the compound shown in Formula (2) was not used. The peeling test identical to that mentioned above was carried out. The results are shown in Table I.

TABLE I

| Classification Metal Plates | Results of adhesion test by peeling | |
|---|---|---|
| | Example | Comparison Example |
| Stainless steel | 12.0 kg/cm² | 0.3 kg/cm² |
| Pure aluminum | 13.0 kg/cm² | 0.4 kg/cm² |
| Nickel | 10.0 kg/cm² | 0.2 kg/cm² |
| Copper | 12.4 kg/cm² | 0.3 kg/cm² |
| Iron plate plated with zinc | 9.0 kg/cm² | 0.2 kg/cm² |

EXAMPLE 3

100 parts of a high molecular weight organopolysiloxane whose plasticity index was 140 and which was composed of 97 mol% dimethylsiloxane and 3 mol% methylphenylsiloxane was combined with 2.0 parts of the compound shown in Formula (3) and

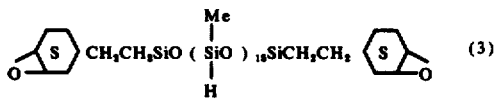

30 parts acetylene black. The resulting mixture was blended using a two-roller mixer until it was homogeneous. 100 parts of this mixture was combined with 2.0 parts dicumylperoxide using a two-roller mixer to form a sheet.

The resulting sheet was inserted between two films made of the material shown in Table II. The dimensions of the film was 60 mm × 10 mm × 0.1 mm. The thickness of the sheet was 1.0 mm and the overlap of the two films was 10 mm. Press vulcanization was carried out at 150° C. for 10 minutes. The composite films were cooled to room temperature. The ends of the two films were drawn in opposite (at 180°) directions. The results are shown in Table II. For comparison the composition was produced by a method identical to that mentioned above with the exception that the compound shown in Formula (3) was not added. A test identical to that mentioned above was carried out.

TABLE II

| Classification | Results of adhesion test | |
|---|---|---|
| | Example | Comparison |
| Film | | |
| Lumiror | 100% cohesive failure | 100% adhesive failure |
| (polyethylene terephthalate film from Toray Co.) | | |
| Nomox | 100% cohesive failure | 100% adhesive failure |
| (aromatic polyamide film from du Pont Co.) | | |
| Capton polyimide film from du Pont Co.) | 100% cohesive failure | 100% adhesive failure |

EXAMPLE 4

A mixture of 70 parts of an organopolysiloxane copolymer whose viscosity was 7400 cs. and which was composed of 29.6 mol% phenylvinylsiloxane, 62 mol% phenylmethylsiloxane and 8.4 mol% phenylmethylvinylsiloxane, and 30 parts of an organopolysiloxane whose chemical formula was

was combined with 1.0 part of an organopolysiloxane copolymer composed of 50 mol% MeSiO$_{1.5}$, 4 mol% ViSiO$_{1.5}$, 40 mol% Me$_2$SiO and 6 mol%

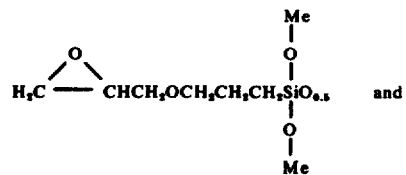 and 1.0 part di-t-butylperoxide. The resulting mixture was poured into a copper box. Curing was carried out at 160° C. for 15 minutes. The box was cooled to room temperature and was turned upside down. The top of the box was tapped; however, the cured silicone varnish adhered to the box so tightly that it could not be removed.

For comparison a composition was produced by a method identical to that mentioned above with the exception that the organopolysiloxane copolymer composed of 50 mol% MeSiO$_{1.5}$, 4 mol% ViSiO$_{1.5}$, 40 mol% Me$_2$SiO, and 6 mol%

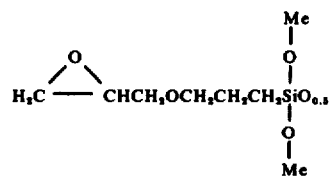

was not mixed in. The resulting composition was poured into a box made of copper. Curing was carried out at 160° C. for 15 minutes. The box was cooled to room temperature and turned upside down, and the cured silicone resin fell out of the box.

That which is claimed is:

1. A heat curable organopolysiloxane composition which consists of
   1. 100 parts by weight of an organopolysiloxane having the general formula $$R_aSiO_{4-a/2}$$

wherein R is a hydroxy group, an alkoxy radical containing 1–4 carbon atoms or a substituted or unsubstituted hydrocarbon radical containing 1–8 carbon atoms, $a$ is 1–3 and at least 25 mol percent of the R groups are monovalent unsubstituted hydrocarbon groups,
   2. 0–400 parts by weight of particulate of fibrous filler,
   3. 0.01–10 part by weight of an organic peroxide catalyst and,
   4. 0.01–20 parts by weight of an organosilicon compound having
      i. at least one A(R'O)$_2$Si— group attached thereto wherein A is a monovalent hydrocarbon group containing at least one

R' is a low molecular weight alkyl group, and
      ii. at least one alkyl group containing 1–4 carbon atoms or
      iii. at least one low molecular weight alkenyl group or hydrogen atom bound to silicon.

2. A heat curable organopolysiloxane composition as in claim 1 wherein there is present
   1. 100 parts of a polydimethylsiloxane having a plasticity index of 150,
   2. 39.8 parts of silica filler which has been treated to make its surface hydrophobic,
   3. 1.12 parts of 2,4-dichlorobenzoyl peroxide and
   4. 0.985 parts of

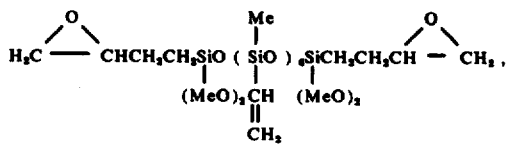

* * * * *